United States Patent Office 3,661,852
Patented May 9, 1972

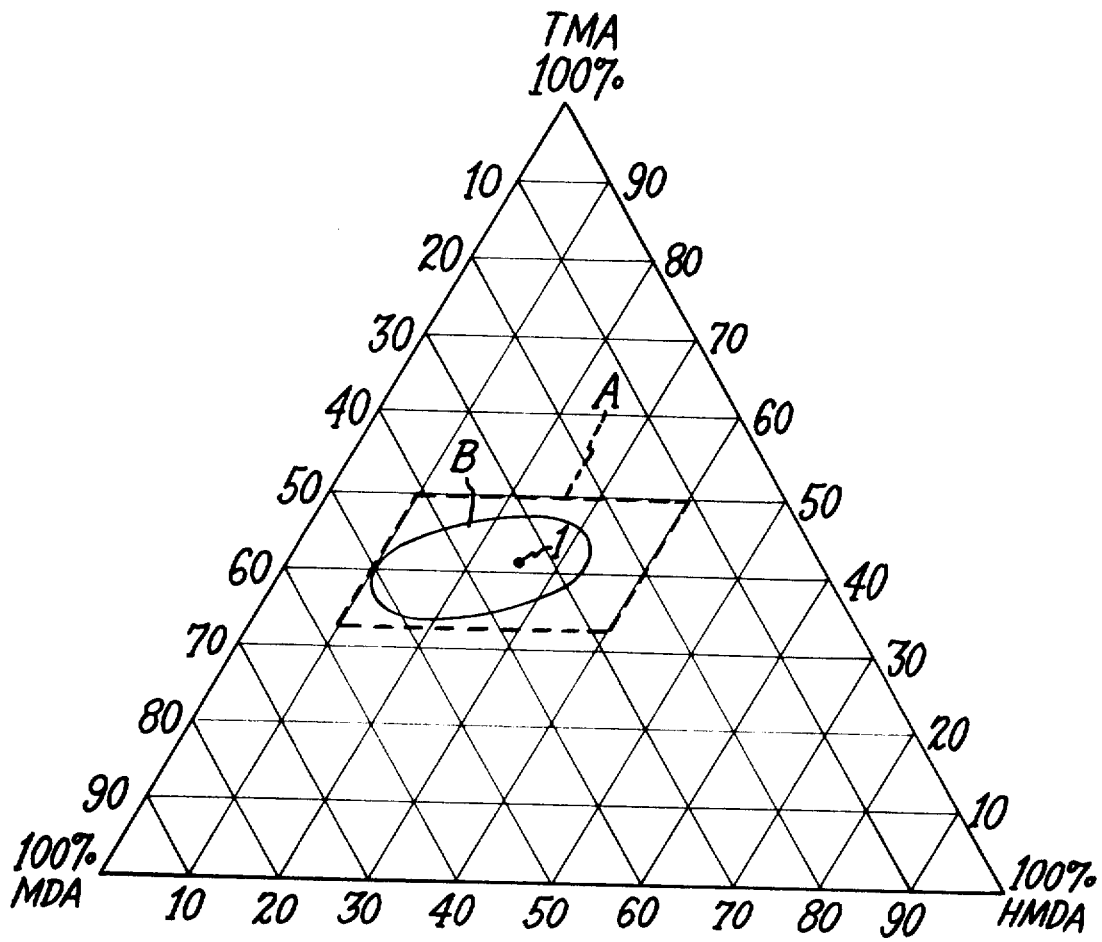
PROPORTIONS — MOLE PERCENT:
TRIMELLITIC ANHYDRIDE ____ TMA
METHYLENE DIANILINE ____ MDA
HEXAMETHYLENE DIAMINE ____ HMDA
Inventors,
Ralph G. Flowers,
Thomas L. Sherer,
by Sidney Greenberg
Their Attorney.

3,661,852
POLYAMIDE-IMIDE COMPOSITIONS WITH
IMPROVED HYDROLYTIC STABILITY
Ralph G. Flowers, Pittsfield, and Thomas L. Sherer,
Richmond, Mass., assignors to General Electric Company
Filed May 11, 1970, Ser. No. 36,309
Int. Cl. C08g 20/32
U.S. Cl. 260—65  5 Claims

ABSTRACT OF THE DISCLOSURE

This invention relates to new polyamide-imide compositions having improved hydrolytic stability and formed by reacting maleic anhydride with the product obtained by reacting a dianhydride with an intermediate diamine formed by reaction of trimellitic anhydride, hexamethylene diamine and an aromatic diamine. The resulting composition is useful for electrical insulating purposes in the form of films or coatings.

---

It is an object of the invention to provide novel polyamide-imide compositions useful for electrical insulating purposes, especially in the form of films or coatings, as on electrical conductors.

It is a particular object of the invention to provide novel polyamide-imide compositions of the above type which have excellent hydrolytic stability and are especially suited for use as wire coated materials in dielectric liquid-filled electrical apparatus such as power and distribution transformers.

It is still another object of the invention to provide polyamide-imide compositions of the above type having good flexibility, toughness and good electrical insulating and other properties.

Another object of the invention is to provide polyamide-imide compositions of the above type formed of relatively low cost materials which are readily soluble in inexpensive solvents such as cresol.

Other objects and advantages will become apparent from the following description and the appended claims.

With the above objects in view, the present invention in one of its aspects relates to a polyamide-imide composition comprising the product obtained by reacting (1) the reaction product of an aromatic diamine, trimellitic anhydride and hexamethylene diamine in the molar proportions hereinafter disclosed, with (2) a dianhydride, and reacting the thus obtained product with maleic anhydride.

This invention is an improvement on the polyamide-imide compositions disclosed in co-pending application of Flowers et al., Ser. No. 36,217, filed May 11, 1970, and assigned to the same assignee as the present invention.

The invention will be better understood from the following description taken in conjunction with the acompanying drawing, in which:

The single figure is a triaxial diagram showing the relative molar proportions of the components forming an amide-imide diamine in accordance with the invention.

Trimellitic anhydride, employed as one of the components for forming the amide-imide diamine, has the following formula:

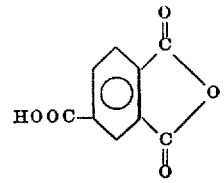

Hexamethylene diamine, used as a second component for forming the amide-imide diamine, has the following formula:

$$H_2N—(CH_2)_6—NH_2$$

The aromatic diamine employed as the third component in forming the amide-imide diamine has the formula $$H_2N—R—NH_2$$

where R is a divalent aromatic group, the two amino radicals being attached to separate carbon atoms of the divalent group. While p,p' methylene dianiline has been satisfactorily employed for this component, other aromatic diamines may be used, such as those listed in U.S. Pat. 3,179,614—Edwards and elsewhere, including benzidine, 4,4'-diamino diphenyl ether, 3,3'-dimethoxy-4,4'-diamino diphenyl methane, meta-phenylene diamine, para-phenylene diamine, 4,4'-diamino diphenyl methane, and others.

Following the reaction among the above-described ingredients to form the amide-imide diamine intermediate, the latter is reacted with a dianhydride having the formula

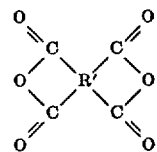

where R' is a tetravalent organic radical selected from substituted and unsubstituted cycloaliphatic, heterocyclic, aromatic and alkyl-aromatic groups. Among the anhydrides useful in this connection are pyromellitic dianhydride, 2,3,6,7 - naphthalene tetracarboxylic dianhydride, 3,3',4,4'-diphenyl tetracarboxylic dianhydride, 1,2,5,6-naphthalene tetracarboxylic dianhydride, 2,2',3',3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride, bis(3,4-dicarboxyphenyl) ether dianhydride, naphthalene-1,2,4,5-tetracarboxylic dianhydride, 2,2-bis(2,3-dicarboxyphenyl) propane dianhydride, 1,1-bis(2,3-dicarboxyphenyl) ethane dianhydride, 1,1-bis(3,4.dicarboxyphenyl) ethane dianhydride, bis(2,3-dicarboxyphenyl) methane dianhydride, bis(3,4-dicarboxyphenyl) methane dianhydride, benzene-1,2,3,4-tetracarboxylic dianhydride, pyrazine-2,3,5,6-tetracarboxylic dianhydride, thiophene-2,3,4,5-tetracarboxylic dianhydride, 1,2,3,4-cyclopentane tetracarboxylic dianhydride, 7,7'-(2-butenylene)-di-2-norbornene-5,6-dicarboxylic anhydride, benzalazine dianhydride. Nadic dianhydride, and ethylene-bis(trimellitate) dianhydride. A particularly satisfactory dianhydride which may be used for this purpose is 3,4,3',4'-benzophenone tetracarboxylic dianhydride.

In accordance with the present invention, the polyamide-imide composition obtained as described above is reacted with maleic anhydride. The final product obtained by this reaction, also referred to herein as a polyamide-imide composition, has been found to have exceptionally good hydrolytic stability while retaining excellent electrical properties, and coatings and films composed thereof are accordingly particularly satisfactory for use in electrical apparatus where exposure to moisture, evolved, for example, from cellulosic insulation therein, is likely. The amount of maleic anhydride used for the foregoing reaction is preferably in the range of about 1% to about 20% based in the weight of the remaining ingredients of the polyamide-imide composition with which it is reacted, and a range of about 3% to about 5% by weight of maleic anhydride is particularly preferred.

The following is a typical procedure which may be used for preparing the amide-imide diamine intermediate and reacting it with the dianhydride to form the initial polyamide-imide composition. The three ingredients trimellitic anhydride, hexamethylene diamine and the aromatic diamine, such as methylene dianiline, in suitable proportions are mixed together with sufficient xylene to act as a heat transfer agent and facilitate the reaction. This mixture is then heated at elevated temperaure, e.g., about 250° C., until the reaction is essentially complete as indicated by removal of the water of condensation. The xylene is removed during this reaction as the temperature increases. While hot, the reaction product is relatively viscous, and it is dissolved while in this condition in a suitable solvent such as cresol. The cresol solution is reacted with the dianhydride at about 40° C. for about one-half hour to produce a polyamide acid, and the temperature is then raised to about 110–120° C., over a period of about one-half hour to convert the polyamide acid to a polyamide-imide. Maleic anhydride in suitable amount is then added to the thus obtained polyamide-imide composition and the mixture heated at 100–120° C. for about one-half hour to provide the final reaction product.

To provide an amide-imide diamine intermediate which on reaction with a dianhydride and maleic anhydride produces a polyamide-imide composition with the desired properties in accordance with this invention, it is necessary to employ the three components of the intermediate diamine composition in a particular range of proportions. The relative amounts of trimellitic anhydride, hexamethylene diamine, and methylene dianiline in a preferred embodiment are depicted in the triaxial diagram of the drawing, in which the proportions of the ingredients are plotted in terms of mole percentages. The proportions of the ingredients which provide improved results in accordance with the invention lie within the area designated A, with a particularly preferred range of proportions lying within the portion thereof designated area B. As is well understood, the variable percentages of the three components represented by any point on the diagram are determined by projections to the relevant mole percentage scales along the sides of the triangle. Thus, for example, point 1 represents a preferred embodiment, corresponding to Example I described below, in which the components are present in the following approximate mole percents: trimellitic anhydride—42%, hexamethylene diamine—25%, and methylene dianiline—33%, which are obtained by the use of 5, 3 and 4 moles respectively of these components. As can be readily calculated, these amounts respectively correspond to the following approximate percentages by weight: trimellitic anhydride—46%, hexamethylene diamine—16%, and methylene dianiline—38%.

The approximate ranges of proportions in terms of percent by weight which may be used in accordance with the invention, where methylene dianiline is used as the aromatic diamine, are as follows, it being understood that the partciular proportions used must still conform in terms of molar percents lying within area A of the accompanying triaxial diagram:

|  | Percent |
|---|---|
| Trimellitic anhydride (TMA) | 30–60 |
| Hexamethylene diamine (HMDA) | 6–30 |
| Methylene dianiline (MDA) | 12–60 |

In reacting the dianhydride with the amide-imide diamine intermediate, about 5–45% of the dianhydride by weight of the intermediate is used, depending on the properties of the final product desired and the compositions of the intermediate used. Using the same intermediate, with lower amounts of dianhydride, less viscous solutions of the polymers are obtained, and with greater amounts of dianhydride, more viscous solutions are produced. An excessive amount of dianhydride may result in loss of flexibility or a brittle product.

The product obtained by the reaction of the amide-imide diamine intermediate and the dianhydride is a polyamide-imide composition which is mostly aromatic but contains enough hexamethylene groups to give the desired properties such as flexibility. The complexity of this product is governed by the wide variations possible in the intermediate diamine composition. Due to the differences in the reactivity of the aromatic and aliphatic diamines with the trimellitic anhydride, it is believed that the hexamethylene diamine reacts first with the anhydride group of the trimellitic anhydride and then with the carboxyl group of the trimellitic anhydride. As the mole ratio of the reactants is varied, the nature of the diamine intermediate composition would thus be changed to include a polymeric hexamethylene trimellitate as well as simple and complex diamines formed by the reaction of $x$ moles of trimellitic anhydride with $x+1$ moles of the hexamethylene diamine-aromatic diamine mixture.

The final products obtained by the reaction of the maleic anhydride with the above-described polyamide-imide compositions are believed to be similar in structure but contain some crosslinking due to the maleic anhydride double bond following a neutralization of any free amine groups with the anhydride.

The examples below will illustrate the practice of the invention, it being understood that they are to be taken as exemplary only:

EXAMPLE I

In this example, 96 parts by weight of trimellitic anhydride were mixed with 36 parts of hexamethylene diamine and 80 parts of methylene dianiline, corresponding to 5, 3 and 4 moles of the respective ingredients. This mixture in the presence of about 35 parts by weight of xylene was heated with infrared lights in a one liter flask with an $N_2$ sparge tube, stirrer, thermocouple well and a condenser with a Dean-Stark trap. The temperature was raised rapidly up to about 175° C., at which time an exothermic reaction occurred. Heating was continued until a temperature of about 250–260° C. was reached, where it was held for about one hour. The resultant intermediate diamine was dissolved in dry cresol to make a 24% solution. Then parts of this 24% solution were then thinned with 6 parts of dry cresol and reacted at 40° C. for one-half hour with about 0.42 part by weight of 3,4,3',4'-benzophenone tetracarboxylic dianhydride. The resultant polymeric composition was then heated to about 120° C. over a period of one-half hour to convert it to the imide. Then, .19 part of maleic anhydride, amounting to about 7% of the weight of the above composition, was added to the latter while hot, the mixture was stirred for one-half hour, and the solution was allowed to cool to room temperature. The viscous material thus obtained was applied to the surface of a thin aluminum disk and cured at 200° C. for 20 minutes and then 300° C. for 5 minutes. The hydrolytic stability of the coating thus formed was tested by placing the coated aluminum disk in a closed container along with humidified paper and then heating at 185° C. for sixteen hours. Following removal of the coated disk, it was found that the coating retained its initial flexibility, and represented an improvement in this respect over the coating obtained from the same procedure without the addition of maleic anhydride. The coating was also characterized by low dissipation factor at elevated temperature, and was a tough, flexible film having good electrical properties.

EXAMPLE II

In this example, the procedure of Example I was used except that .10 part of maleic anhydride was added, amounting to about 3.6% by weight of the remaining ingredients. A very flexible film of excellent hydrolytic stability was obtained.

EXAMPLE III

In the procedure like that of Example I except that .37 part maleic anhydride was used (13.3% by weight), a very flexible film of similar characteristics was obtained.

EXAMPLE IV

A procedure was carried out as described in Example I except that 31 parts by weight of trimellitic anhydride, 32 parts methylene dianiline, and 9.3 parts of hexamethylene diamine (corresponding to 2, 2 and 1 moles respectively) were reacted as in Example I without the presence of xylene, and the intermediate diamine obtained was reacted with 8.5 parts of the aforementioned benzophenone dianhydride. Following this reaction, 10.5 parts by weight of maleic anhydride (about 13% by weight) were added to the solution. A very flexible film of excellent hydrolytic stability and electrical properties was obtained.

EXAMPLE V

In this example, an intermediate diamine as obtained in Example I was reacted with pyromellitic dianhydride in an amount of about 12% by weight of the intermediate, using the procedure as described in Example I. In this example, about 7½% by weight of maleic anhydride was used, and a coating of polyamide-imide composition was obtained, using the Example I procedure. This coating was also very flexible and had excellent hydrolytic stability and electrical insulating properties.

EXAMPLE VI

In this example, an intermediate diamine was obtained by the procedures described in Example I, using 45% by weight trimellitic anhydride, 9% hexamethylene diamine, and 46% methylene dianiline (corresponding to 3, 1 and 3 moles respectively), and this intermediate was reacted with 16% by weight of Nadic dianhydride using the conditions substantially as described in Example I. This reaction product was reacted as previously described with 7.2% by weight of maleic anhydride, and the electrically insulating coating produced thereby was found to be very flexible and had excellent hydrolytic stability.

EXAMPLE VII

A diamine intermediate as obtained in Example VI was reacted with about 17.5% by weight of benzophenone dianhydride and about 7% by weight of maleic anhydride was added, using procedures as described in Example I. The final coating obtained was likewise very flexible and had excellent hydrolytic stability and electrical properties.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A polyamide-imide composition comprising the product obtained by reacting (1) the reaction product of trimellitic anhydride, hexamethylene diamine and an aromatic diamine with (2) a dianhydride, and reacting the thus obtained product with about 1% to about 20% of maleic anhydride by weight of the remaining ingredients, wherein said trimellitic anhydride, hexamethylene diamine and aromatic diamine have molar proportions lying within the area defined approximately by area B in the accompanying triaxial diagram, said dianhydride having the formula

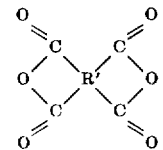

where R' is a tetravalent organic radical selected from the group consisting of cycloaliphatic, aromatic and alkylaromatic groups.

2. A composition as defined in claim 1, wherein said aromatic diamine is methylene dianiline.

3. A composition as defined in claim 2, wherein said dianhydride is 3,4,3',4' benzophenone tetracarboxylic dianhydride.

4. A composition as defined in claim 2, wherein about 3% to about 15% of maleic anhydride by weight of the remaining ingredients is employed.

5. A metal having a coating thereon of a polyamide-imide composition as defined in claim 2.

References Cited

UNITED STATES PATENTS

| | | | |
|---|---|---|---|
| 3,179,635 | 4/1965 | Frost et al. | 260—78 |
| 3,260,691 | 7/1966 | Lavin et al. | 260—30.2 |
| 3,347,828 | 10/1967 | Stephens et al. | 260—47 |
| 3,355,427 | 11/1967 | Loncrini | 260—47 |
| 3,485,796 | 12/1969 | Naselow | 260—47 |
| 3,528,950 | 9/1970 | Lubowitz | 260—78.4 |

WILLIAM H. SHORT, Primary Examiner

L. L. LEE, Assistant Examiner

U.S. Cl. X.R.

117—132 B, 161 UN; 260—33.4 P, 33.6 R, 47 CP, 78 TF

UNITED STATES PATENT OFFICE
CERTIFICATE OF CORRECTION

Patent No. 3,661,852     Dated May 9, 1972

Inventor(s) Ralph G. Flowers, and Thomas L. Sherer

It is certified that error appears in the above-identified patent and that said Letters Patent are hereby corrected as shown below:

In the Specification:

Col. 2, line 47, delete " ' " in first number 3.

In the Claims:

Claim 4, line 1, change "Claim 2" to - Claim 1 -

Claim 5, line 2, change "Claim 2" to - Claim 1 -

Signed and sealed this 25th day of July 1972.

(SEAL)
Attest:

EDWARD M. FLETCHER, JR.    ROBERT GOTTSCHALK
Attesting Officer    Commissioner of Patents